US012565763B2

(12) United States Patent
Schlueter et al.

(10) Patent No.: US 12,565,763 B2
(45) Date of Patent: Mar. 3, 2026

(54) SPRAY HEAD FOR A WATER FAUCET

(71) Applicant: Grohe AG, Hemer (DE)

(72) Inventors: Matthias Schlueter, Dortmund (DE); Hans-Dieter Keiter, Menden (DE)

(73) Assignee: GROHE AG, Hemer (DE)

( * ) Notice: Subject to any disclaimer, the term of this patent is extended or adjusted under 35 U.S.C. 154(b) by 226 days.

(21) Appl. No.: 18/279,261

(22) PCT Filed: Mar. 14, 2022

(86) PCT No.: PCT/EP2022/056432

§ 371 (c)(1),
(2) Date: Aug. 29, 2023

(87) PCT Pub. No.: WO2022/194726

PCT Pub. Date: Sep. 22, 2022

(65) Prior Publication Data

US 2024/0133166 A1 Apr. 25, 2024
US 2024/0229432 A9 Jul. 11, 2024

(30) Foreign Application Priority Data

Mar. 17, 2021 (DE) ..................... 10 2021 106 445.7

(51) Int. Cl.

*E03C 1/04* (2006.01)
*B05B 1/18* (2006.01)
*B05B 1/30* (2006.01)

(52) U.S. Cl.

CPC .............. *E03C 1/0404* (2013.01); *B05B 1/18* (2013.01); *B05B 1/3026* (2013.01)

(58) Field of Classification Search

CPC ....... E03C 1/0404; E03C 1/0405; B05B 1/16; B05B 1/18; B05B 1/1627; B05B 1/1636; B05B 1/3026

(Continued)

(56) References Cited

U.S. PATENT DOCUMENTS 7,494,074 B2 * 2/2009 Benstead ................ E03C 1/084
239/447
7,909,269 B2 * 3/2011 Erickson ............... B05B 12/002
239/443

(Continued)

FOREIGN PATENT DOCUMENTS

| | | |
|---|---|---|
| EP | 1 418 008 | 5/2004 |
| WO | 2004/103135 | 12/2004 |
| WO | 2014/146034 | 9/2014 |

OTHER PUBLICATIONS

International Search Report dated May 30, 2022, in International (PCT) Application No. PCT/EP2022/056432 with English translation.

*Primary Examiner* — Steven J Ganey

(74) *Attorney, Agent, or Firm* — Wenderoth, Lind & Ponack, L.L.P.

(57) ABSTRACT

A spray head (1) for a water faucet (2) having a water inlet (3), and at least one first water outlet (4), one second water outlet (5) and one changeover valve (6) for selectively activating a first water-conducting connection (7) from the water inlet (3) to the first water outlet (4) or a second water-conducting connection (8) from the water inlet (3) to the second water outlet (5), wherein the changeover valve (6) is connected to a setting means (9), which has a push button (10) and which is designed such that an actuation of the push button (10) makes it possible to change from the first water-conducting connection (7) to the second water-conducting connection (8) and vice versa.

15 Claims, 6 Drawing Sheets

Figure 1:
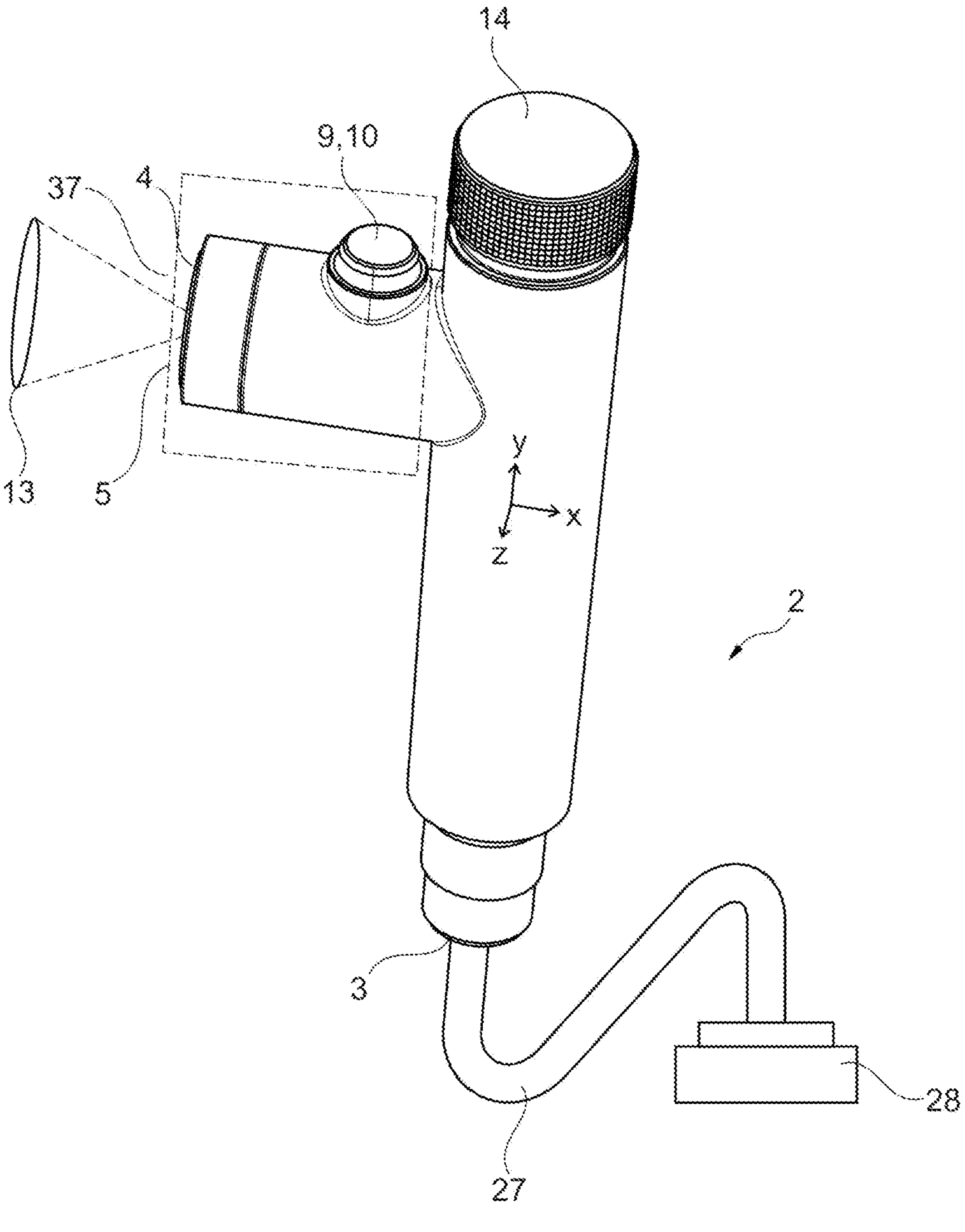

(58) Field of Classification Search
USPC .................................................. 239/443–447
See application file for complete search history.

(56) References Cited

U.S. PATENT DOCUMENTS

| | | | | |
|---|---|---|---|---|
| 8,448,667 | B2 * | 5/2013 | Meehan ................ | E03C 1/0404 239/445 |
| 8,800,893 | B2 * | 8/2014 | Malek ................... | E03C 1/0405 239/447 |
| 9,707,572 | B2 * | 7/2017 | Erickson ................... | B05B 1/18 |
| 2018/0126393 | A1 | 5/2018 | Wang et al. | |

* cited by examiner

SPRAY HEAD FOR A WATER FAUCET

Described here is a spray head for a water faucet, which in particular, is suitable for applications in kitchens. Recently, hygienic requirements for water faucets and spray heads have become more and more stringent. Simultaneously, the need arises to be able to provide the user with multiple types of water jets, making different ways of providing water (for instance, different jet hardnesses) available to the user. For instance, a hard jet with high momentum of the water exiting the water faucet can be used to clean dishes, whereas another (gentler) jet can be used to clean vegetables or perform similar tasks.

In addition, in all applications, it is becoming increasingly important to provide an option for conserving water. Especially preferably, a comfortable and infinitely variable adjustment option for a water jet should be provided This is especially true in the field of application of water faucets in the kitchen.

Special emphasis is to be placed on ease of use.

Based thereon, a particularly advantageous new spray head is to be described, which can be used to both select a desired spray pattern and implement water conservation measures in a complementary manner, wherein simultaneously, operation is especially easy for users.

These problems are solved using a spray head according to the features of claim 1. Further advantageous embodiments of the spray head are specified in the dependent claims; however, the invention is not limited to these. The invention will be explained in greater detail based on the figures and the relevant description.

Described here is a spray head for a water faucet comprising a water inlet, and at least one first water outlet, one second water outlet and one changeover valve, for selectively activating a first water-conducting connection from the water inlet to the first water outlet or a second water-conducting connection from the water inlet to the second water outlet, wherein the changeover valve is connected to a setting means, which comprises a push button and which is designed such that an actuation of the push button makes it possible to change from the first water-conducting connection to the second water-conducting connection and vice versa.

The spray head described here has a special new mechanism for changing the water outlet at which the spray head provides water. Spray heads frequently have several outlets, which can be selected as needed, so that water is provided at these water outlets.

The spray head described here has a special new mechanism for changing the spray pattern, which the spray head uses to provide water. Normally, a specific spray pattern at a spray head is caused by providing water at a specified water outlet, which is designed such that the exiting water there is provided with the particular spray pattern.

The special mechanism claimed here for changing the spray pattern or the individual water outlet makes for an especially ease of use for users. When using a spray head, it is generally important for users to be able to easily understand operation and remember how to get to the desired setting of the spray head. Complex setting options requiring great dexterity or precision in operation and which are not intuitive for users, significantly increase the difficulty of operation.

The mechanism described here is very easy for users to operate. With this mechanism, a push button must always be actuated in order to change outlets. One special advantage is that the same push button must always be actuated when changing the outlet through which the shower head provides water. The mechanism described here can also be referred to as a ball point pen mechanism.

In the case of a ball point pen, ordinarily, simply pressing the end of the ball point pen causes the ball point pen point to either appear or disappear. Special ball point pen types are also known in which the available points can be exchanged/substituted by pressing several times and, in the manner of a loop, after cycling through all the points, the point provided first is again provided. For example, in this manner it is possible to cycle between a black point, a red point and a blue point. Such mechanisms are based on the principle that by actuating the push button, an element in a snap mechanism is moved one position further. Such mechanisms can also be used in valves.

In particular, the spray head described here contains a purely mechanical (not electrical) changeover valve, which is designed to respond to actuations of the push button such that selectively a first water-conducting connection opens to a first outlet or a second water-conducting connection opens to a second outlet. The mechanics of the changeover valve are based on the described ball point pen mechanism. By means of such a changeover valve, it is technically possible in an especially advantageous manner to provide the various spray patterns without the need for sophisticated technology (in particular, the electronics) in the spray head.

More complex applications are also conceivable, in which an electronic changeover valve is present. The push button of the setting means then preferably generates an electronic signal, which is passed on to an electrical controller of the changeover valve and initiates a change of the setting/position of the changeover valve, so that a changeover to another position occurs and another water-conducting connection is established. Theoretically, applications of any desired complexity with any number of different water-conducting connections to any number of different water outlets can be implemented in such electronic variants of the embodiment. It is also conceivable that the changeover valve is not just a single changeover valve, but rather, that there is a plurality of individual electronically controllable valves (in particular, a separate electronic valve for each water-conducting connection and each outlet) and then, in each case, every time the push button is pressed, a different (the next) valve opens and the other valves are closed. This is also included here as a variant of the embodiment. However, the described purely mechanical variants of the embodiment are preferred.

Preferably, the spray head is designed such that precisely two water outlets (a first water outlet and a second water outlet) exist and in addition two water-conducting connections (a first water-conducting connection to the first water outlet and a second water-conducting connection to the second outlet) also exist, wherein the water-conducting connections each establish a connection between the respective water outlets and the water inlets.

Such a spray head is suitable for providing two different spray patterns. An adjustable valve for the changeover between two different water-conducting connections, water outlets and spray patterns can have a relatively simple mechanical design, which technically can be very easily implemented in a water faucet or in a spray head.

The water inlet is a connection at which the spray head described here is supplied with water, which is then provided or used using the spray head described here. The hose is preferably flexible and connected to a fixed installation of the water faucet. The hose makes it possible for the user/operator to flexibly position the spray head for the respective application.

It is especially advantageous if the spray head has at least one further water outlet, wherein the changeover valve is additionally designed to activate either a further water-conducting connection from the water inlet to the further water outlet, wherein by actuating the push button (10) it is possible to change to the further water-conducting connection, wherein by means of repeated actuation of the push button, it is possible to cycle through all water-conducting connections.

This is one particularly advantageous variant of the embodiment, in which it is possible to change between more than two different water outlets. This variant of the embodiment can also be implemented with the mentioned ball point pen mechanism of the changeover valve without electronics. Thus, there is precisely one further water outlet and exactly one further water-conducting connection in the variants of the embodiment preferred in this case. Other variants are also possible, in which it is also possible to change between more different water outlets and water conducting connections. However, if there are more than four different water outlets and water-conducting connections, a purely mechanical implementation becomes difficult or no longer very practicable.

Such variants of the embodiment having three or four different water outlets and water-conducting connections are preferably designed using changeover valves, the changeover mechanism of which is based on ball point pens having several points. It is also the case for such variants of the embodiment that setting the respective spray pattern is very convenient for the user/operator.

Moreover, it is advantageous if every water outlet has an assigned spray pattern, so that a spray pattern can be selected by actuating the push button.

For example, one common spray pattern is a so-called jet spray, which typically consists of a plurality of individual jets. Another common spray pattern is a mousseur jet, in which case a central, very soft jet is provided, which for example can be used to clean vegetables. Yet another preferred spray pattern is a blade jet, which is very hard and which can be used for example to remove tenacious stains from a dish.

Typically, the jet spray is a standard setting, while the mousseur jet or the blade jet are settings that can be selected separately or specifically by a user.

In connection with the use of different outlets for different spray patterns, preferably all outlets are arranged approximately at the same position of the spray head. The user/operator can adjust the spray head as desired in order to provide water at a specified position. By selecting the spray pattern via the push button, the user/operator can then decide which spray pattern shall be used to provide water. Typically, only one water-conducting connection to an outlet is opened or released, while the other water-conducting connections are closed. Hence, it can be ensured that water is always clearly provided with a specified spray pattern. In particular, it is important that always only one water-conducting connection is opened whenever the different outlets for providing different spray patterns are used, because the individual spray pattern typically only appears as desired when all of the water available to the spray head exits the spray head via the one desired outlet.

It has already been stated that the selection of the outlet via the push button and using the ball point pen mechanism is a particularly advantageous option for the user/operator. If the outlets are each assigned different spray patterns, this particularly advantageous technology can be used on a spray head to select the spray pattern.

Of course, it is also possible to find other applications for this mechanism in a changeover valve. For example, the mechanism with the push button and the changeover valve can be used to shift between different outlet positions on the spray head. All applications are possible in which the change of a water outlet by means of a corresponding mechanism (setting means) using push button and changeover valve is applicable.

In addition, it is advantageous when the spray head has a flow rate setting means, which can be used to adjust a flow rate of water through a water-conducting connection from the water inlet to a water outlet of the spray head.

Moreover, it is advantageous, when the flow rate setting means can be used to infinitely adjusted a flow rate.

Such a flow rate setting means is preferably a controllable flow rate setting means, for example a rotary control or a rotary valve. Such a flow rate setting means makes a very precise setting of the flow rate possible.

The combined operation using a push button to select the spray pattern/outlet and an infinitely adjustable flow rate setting means is particularly advantageous, because it implements a particularly high degree of operating comfort for the user/operator.

Moreover, it is advantageous when the changeover valve has a valve body and a valve chamber, in which the valve body is moveably arranged and the first water-conducting connection and the second water-conducting connection extend through the valve chamber, wherein

- the first water-conducting connection is opened and the second water-conducting connection is closed when the valve body is in a first position in the valve chamber and
- the second water-conducting connection is opened and the first water-conducting connection is closed when the valve body is in a second position in the valve chamber, wherein the first position and the second position are spaced apart from each other along an axis of the valve chamber and/or at a rotation angle of the valve body in the valve chamber and by actuating the push button the valve body is moved from the first position to the second position and vice versa.

The valve chamber is preferably a cylindrical opening or a cylindrical receiving chamber within the spray head. The valve body is, preferably axially displaceable along an axis and mounted for rotation about this axis in the valve chamber.

Depending on position in an axial direction along an axis and/or in the direction of rotation along a rotation angle of the valve body in the valve chamber, other connection channels are produced for establishing the first water-conducting connection or the second water-conducting connection and the respective other connection channels for establishing the respective other water-conducting connections are closed. The water-conducting connections preferably all extend through the valve chamber. Depending on the position of the valve body in the valve chamber, specified water-conducting connections are closed.

A changeover valve constructed in such manner using the described setting means having a mechanism comprising a push button can be actuated in a particularly advantageous manner. In particular, this succeeds because the actuation of the push button causes an axial movement along the axis of the chamber and preferably guide bevels are provided on components of the changeover valve or of the setting means, which can be used to convert the axial movement into a rotational movement about the axis. The mechanism suitable for this purpose or a mechanism suitable for this purpose will be described in greater detail below.

Furthermore, the spray head is advantageous when a snap mechanism for the valve body is formed in the valve chamber, which snap mechanism can be used to hold the valve body either in the first position or in the second position.

In variants of the embodiment, the snap mechanism is designed such that the valve body is held by the snap mechanism in the first position and in the second position. However, in one preferable variant, the valve body is held in only one position (preferably in the second position) by the snap mechanism and is freely moveable in the other position (preferably in the first position).

A snap mechanism is characterized in that a stable position is present, which is held by an equilibrium of forces. Preferably the valve body is held in the first position or in the second position by a spring holding two components in a specified position relative to each other and requiring a release from the snap mechanism to overcome the spring force. The spring force can be overcome by pressing the push button. Then the valve body is released from the snap position and can be moved to another position (first position or second position) by guide elements.

Moreover, the spray head is advantageous when the snap mechanism has snap elements each on two components, which in different positions make possible a fixation of the valve body in the first position and in the second position respectively make possible a fixation of the valve body in the valve chamber.

In particular, snap elements can be provided on a snap component, which presses the valve body itself into the relevant position. Snap elements can furthermore preferably be designed on a guide component, which guides the snap element, and which preferably has guide rails, which engage with fixtures of the snap component and along which the snap component can glide. Snap elements can be designed in the form of snap fixtures and snap tips/snap latches.

In one specified position (first position or second position) the snap latch/snap tip is preferably seated in a snap fixture. Then the snap mechanism is locked into place. Pressing the push button releases the snap elements from each other again. Typically, this happens by overcoming the spring force. Then preferably a change of the position of the snap component is performed, and with the snap component also a change of the position of the valve body back to its other position.

In one preferable variant of the embodiment, only one position (in particular, the second position) is designed such that it is held by the snap the snap mechanism into place. If necessary, the valve body can be freely moveable in a first position and it will, if applicable, be moved by the pressure of the water in the spray head such that a first water-conducting connection is opened.

It is also advantageous when the snap mechanism has a spring, which selectively presses the valve body into a snap fixture in the first position and in the second position, wherein by actuating the push button an overcoming of the spring force of the spring causes a movement of the valve body to the other position, wherein, when the push button is released, the spring presses the valve body to the other position.

The spring has already been described as an essential element of the snap mechanism. In particular, the spring serves the purpose of holding the snap mechanism in one position (in particular, in the second position), the spring preferably also serves the purpose of exerting a restoring force on the push button, which ensures that the push button is always pressed back to a home position.

In addition, it is advantageous if the valve body has at least one circumferential O-ring seal, which seals against a valve chamber wall of the valve chamber.

Preferably there are O-ring seals, which, in sections, form a valve body surface of the valve body. This O-ring seal preferably abuts on a valve chamber wall of the valve chamber and can seal there. The O-ring seal preferably constitutes the separation between the different water-conducting connections or the channels forming the water-conducting connection through the changeover valve.

Moreover, it is also advantageous when a first water-conducting connection or a second water-conducting connection open from the circumference into the valve chamber.

It is also advantageous, if at least one first water-conducting connection or one second water-conducting connection opens into the end face of the valve chamber.

One opening each of water-conducting connections into the valve chamber is implemented on the end of the flow path facing the inlet and on the end of the flow path facing the outlet. A water-conducting connection opening into the end face of the valve is preferably implemented toward the one outlet. It is advantageous that such a water-conducting connection can be closed by a plunger element, which is formed on the valve body and which is preferably designed having an O-ring seal, which can come into contact with the valve chamber wall in a fluid-tight manner when the valve body is in a specified position (in particular, in a position in which the first water-conducting connection is closed). opening at the circumference have the advantage that a great many more such opening can be implemented, because the circumferential surface of the valve chamber is large in relation to the end face of the valve chamber. For this reason, the circumferential opening of water-conducting connections is typically implemented for the opening to connect the valve chamber to the water inlet of the spray head and for at least one path to an outlet.

Figure 2:
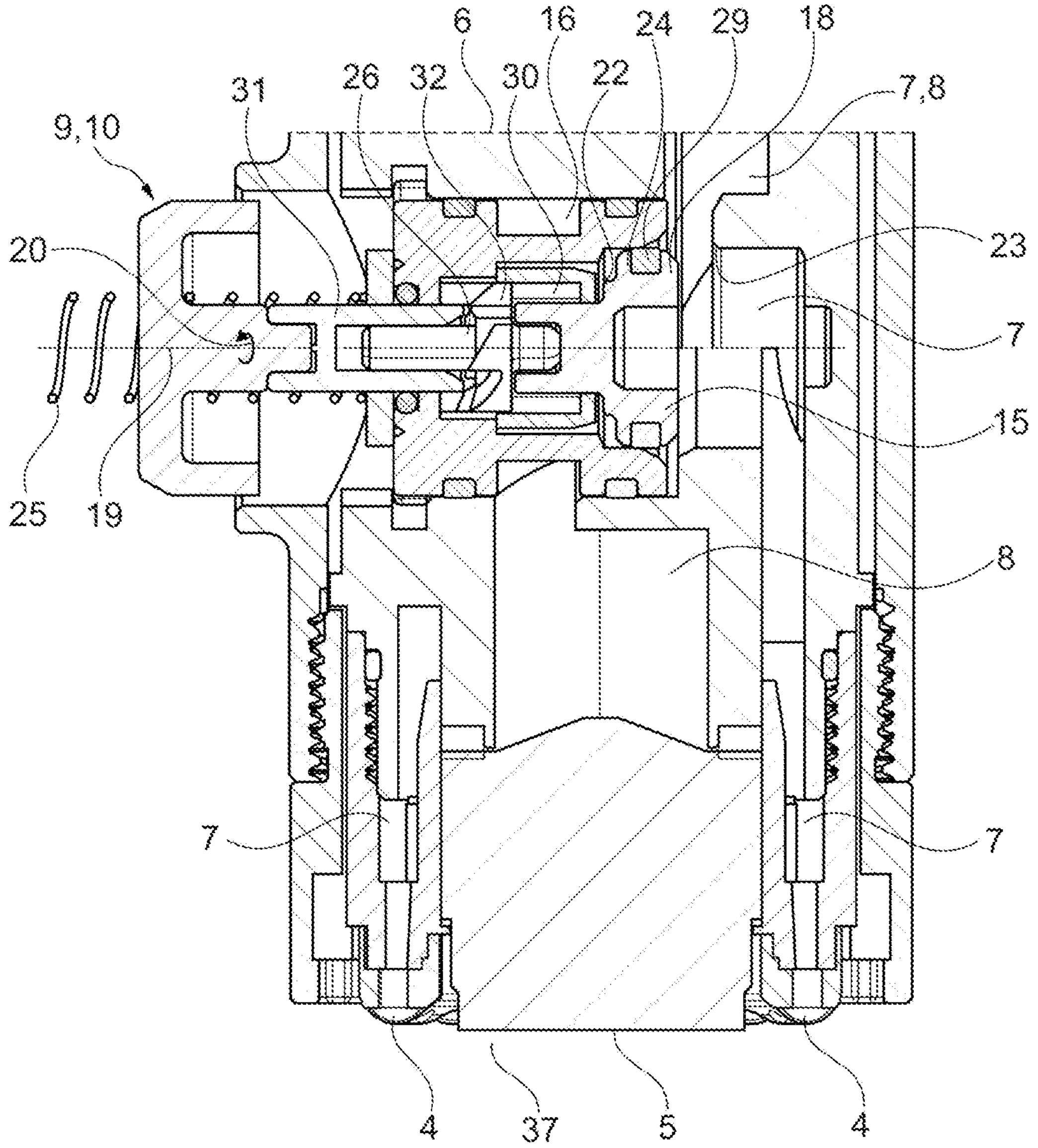
Figure 3:
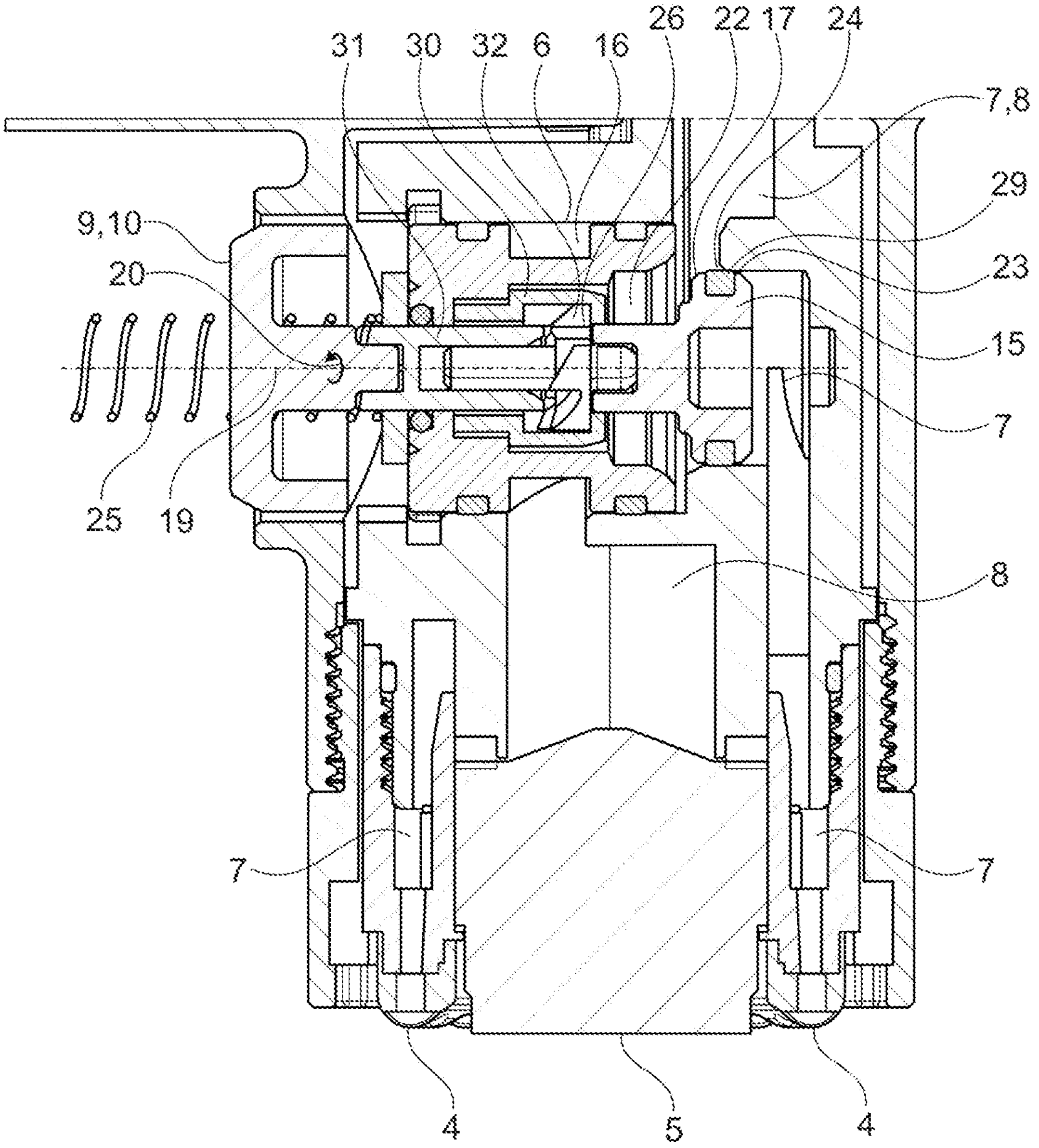
Figure 4:
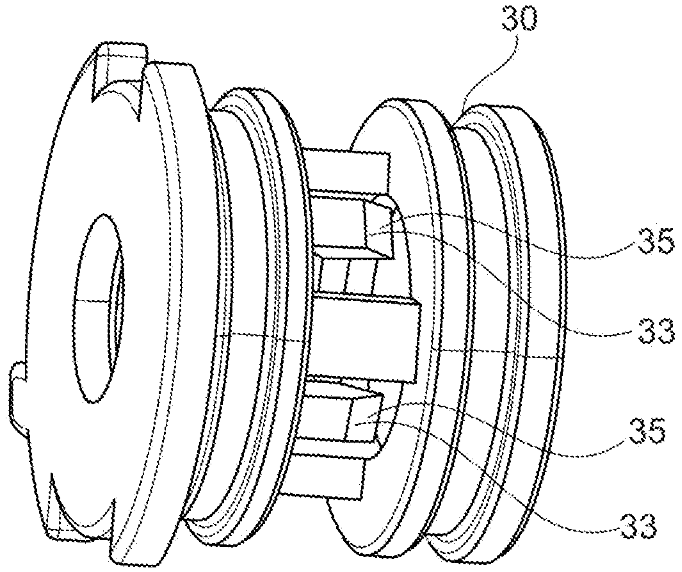
Figure 5:
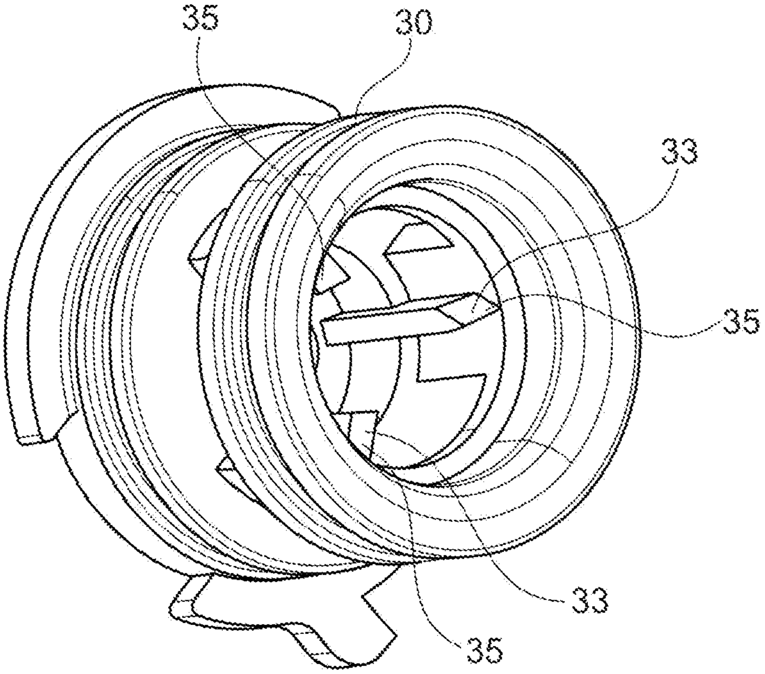
Figure 6:
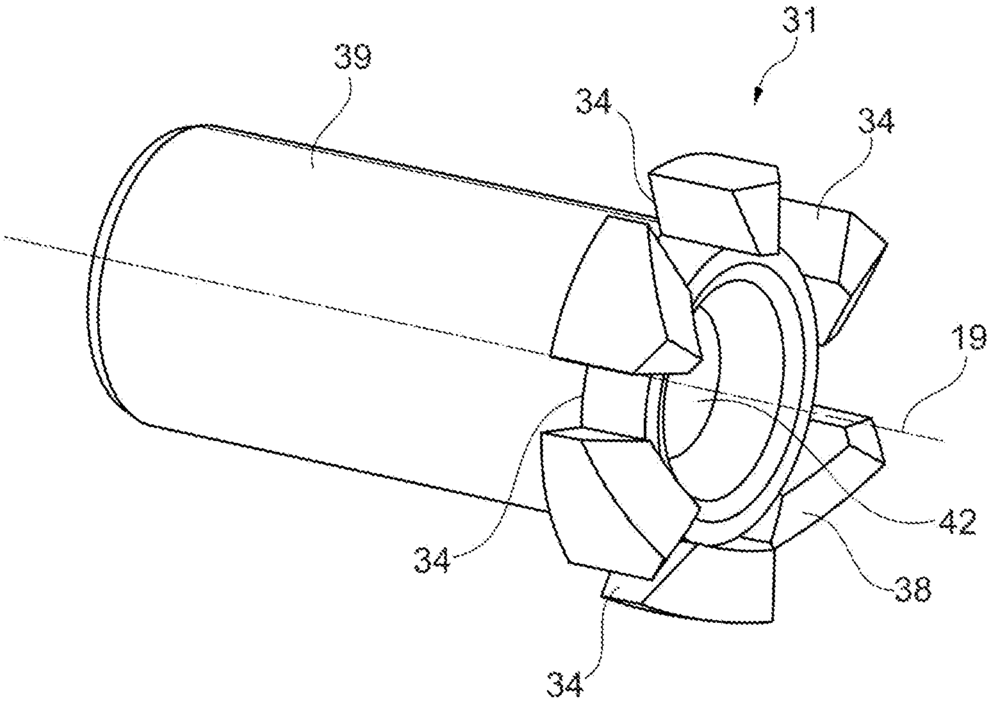
Figure 7:
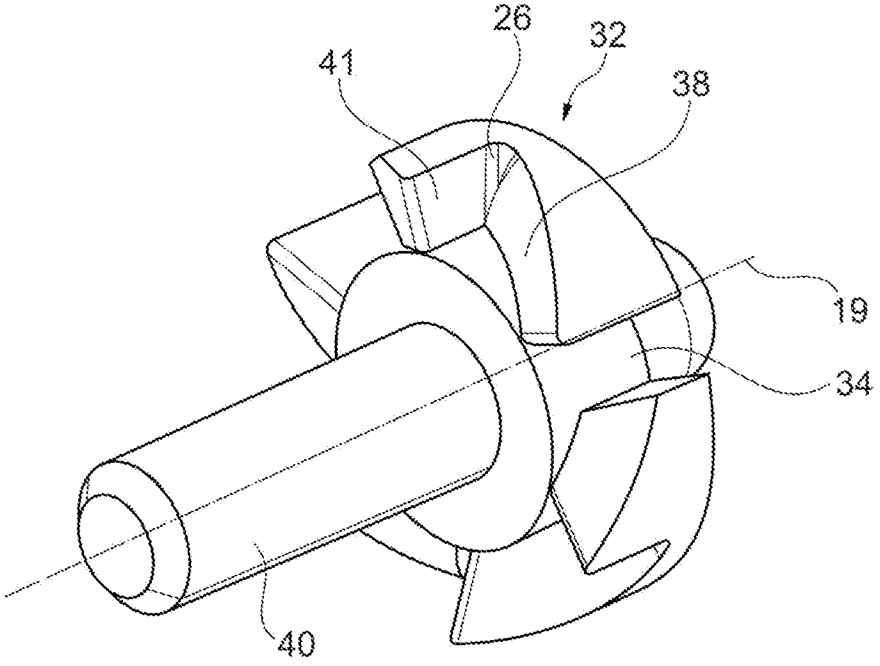
Figure 8:
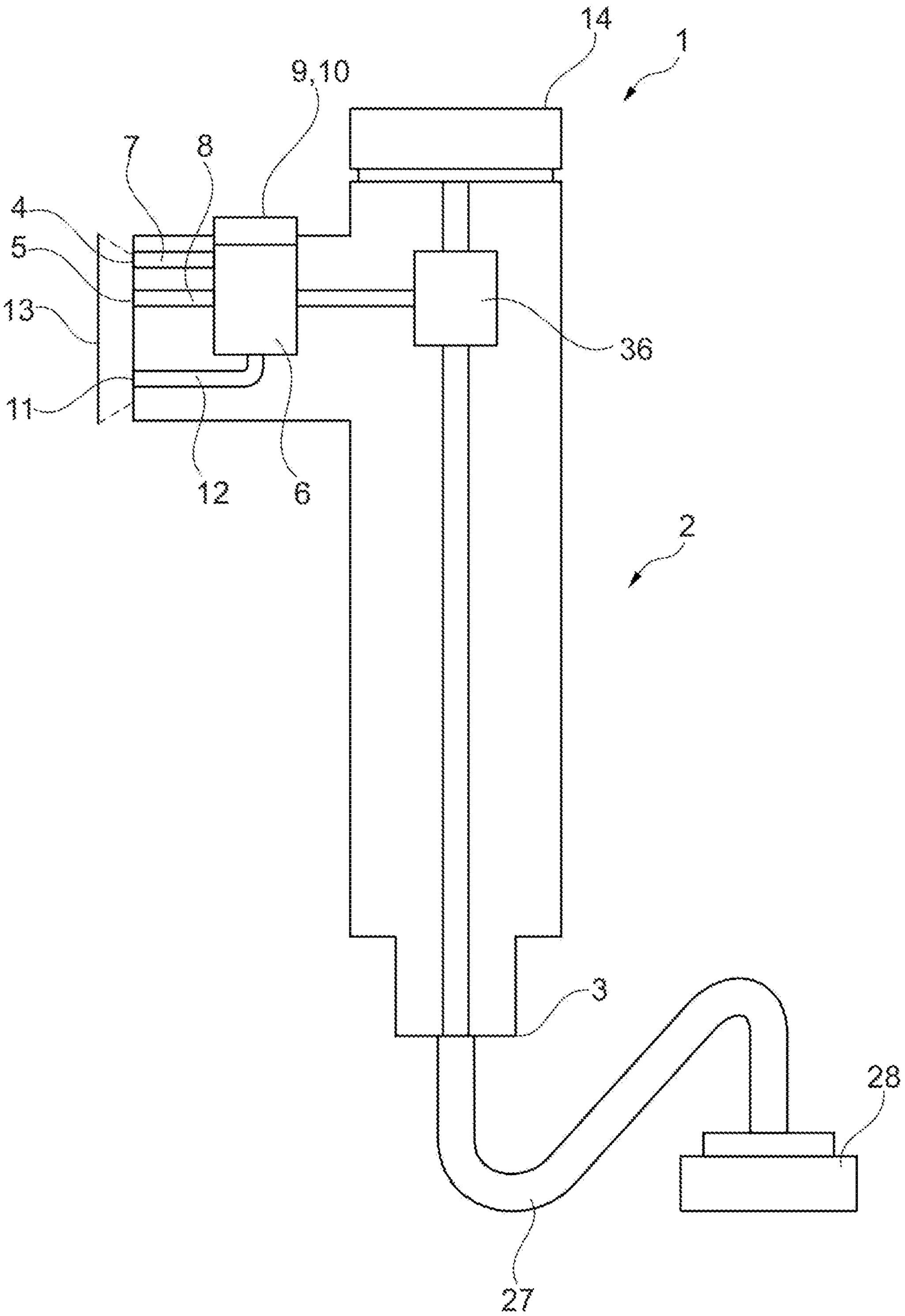

The invention and its technical background will be explained in greater detail below based on the figures. The figures show preferable exemplary embodiments, to which the invention however is not restricted. It should be noted that the figures and in particular the proportions presented in the figures are only schematic. The figures show:

FIG. 1: a described spray head on a water faucet;

FIG. 2: a cross-section through the interior of a described spray head in a first setting;

FIG. 3: a cross-section through the interior of a described spray head in a second setting;

FIG. 4: a first view of a guide component in the interior of a described spray head from FIGS. 2 and 3;

FIG. 5: a second view of a guide component in the interior of a described spray head from FIGS. 2 and 3;

FIG. 6: a first view of a pressure transfer component in the interior of a described spray head from FIGS. 2 and 3;

FIG. 7: a second view of a pressure transfer component in the interior of a described spray head from FIGS. 2 and 3; and FIG. 8: a schematic comprehensive view of an interior of a described spray head on a water faucet.

FIG. 1 shows a water faucet 2 having a described spray head 1. The water faucet 2 has a fixed installation 28. A flexible hose 27 connects the fixed installation 28 to the spray head 1. The hose 27 is connected to a water inlet 3 of the spray head 1. The spray head 1 also has water outlets 4, 5, at which water can be provided with differing spray patterns 13 and which are located at an outlet end 37 of the water faucet 2. Preferably water with a jet spray as spray pattern 13 is provided at a first outlet 4. Preferably water with a mousseur jet as spray pattern 13 is provided at a second outlet 5. The spray head 1 has a setting means 9, which is designed as a push button 10 and can be used to switch between the spray patterns. In addition, the spray head 1 has a flow rate setting means 14, which can be used to preferably infinitely adjust a flow rate or a quantity of water provided at the outlet 4,5. The flow rate setting means 14 is designed as a rotary button in this case. By rotating the flow rate setting means 14, a quantity of water provided/flowing through can be very precisely adjusted.

FIGS. 2 and 3 respectively show a (cutout) cross-section through the interior of a described spray head 1 in the region of the setting means 9, which (as presented in FIG. 1) is designed as a push button 10. Two different settings of the setting means 10 (first setting in FIG. 2 and second setting in FIG. 3) can be seen. For orientation, the region of the cross-section shown in FIGS. 2 and 3 is indicated by a dashed line in FIG. 1. Both FIG. 2 and FIG. 3 show the outlet end 37 with the first water outlet 4 for a jet spray as the first spray pattern and with the second water outlet 5 for a mousseur jet as the second spray pattern. The figures also show the setting means 9. The flow rate setting means (as can be seen in FIG. 1) arranged further upstream and the water inlet are no longer part of the (cutout) cross-section shown in the figures. Proceeding from the water inlet 3, a first water-conducting connection 7 to the first water outlet 4 and a second water-conducting connection 8 to the second water outlet 5 are provided for the water. The setting means 9 can be used to either open or close the first water-conducting connection 7 and the second water-conducting connection 8, respectively, wherein either the first water-conducting connection 7 or the second water-conducting connection 8 is opened and the relevant other water-conducting connection 8, 7 is then closed. The setting means 9 is designed with a changeover valve 6, which can be switched by actuating the push button 10. The changeover valve 6 has a valve chamber 16, in which a valve body 15 is arranged.

The valve body 15 has an O-ring seal 29, which forms a section of a valve body surface 24 sealing in fluid-tight manner against a valve chamber wall 23 of the valve chamber 16 and selectively shuts the first water-conducting connection 7 or the second water-conducting connection 8.

The changeover valve 6 has a mechanism for the changeover between two positions of the valve body 15, which mechanism can also be referred to as a ball point pen mechanism and which consists of the components guide component 30, pressure transfer component 31 and snap component 32. The mechanism will first be explained below based on FIGS. 2 and 3. Then the individual components will be presented in greater detail based on FIGS. 4, 5, 6 and 7 and further details of the mechanism will be explained.

Depending on the position of the valve body 15 in the valve chamber 16, the first water-conducting connection 7 or the second water-conducting connection 8 is activated. A press on the push button 10 by an operator/user is transferred via the pressure transfer component 31 to a snap component 32 mounted on the guide component 30. The snap component 32 and the valve body 15 move in the valve chamber 16 along an axis 19 either to a first position 17 or to a second position 18. In the first position 17, the first water-conducting connection 7 is opened and the second water-conducting connection 8 is closed. This state is shown in FIG. 2. In the second position 18, the first water-conducting connection 7 is closed and the second water-conducting connection 8 is opened. This state is shown in FIG. 3.

Guide rails 33 are provided on the guide component 30, which guide rails specify a guidance corresponding to the axis 19 and along which the snap component 32 is guided. This also blocks a rotational movement of the snap component 32 about the axis 19. The snap component 32 and the pressure transfer component 31 each have fixture grooves 34, with which the guide rails 33 of the guide component 30 engage when the snap component 32 and the valve body 15 are in the first position 17.

In the second position 18, the guide rails 33 are not in the fixture groove 34 of the snap component 32. The guide rails 33 end as snap tips 35 or they taper off as snap tips 35. Behind the snap tips 35 there is a rotation space 22, in which the snap component 32 can be rotated about the axis 19, because a rotational movement of the snap component 32 is no longer prevented by an engagement of the guide rails 33 with the fixture grooves 34. There is a snap mechanism 21, in which the snap component 32 is locked into place in the second position 18. In the process, the snap tips 35 engage in snap fixtures 26 of the snap component 32.

The changeover valve 6 has a spring 25 which causes a return movement of the push button after an actuation of the push button 10. When the valve body 15 is in a first position 17, the pressure transfer component 31, the snap component 32 and the valve body 15 are axially moved such that a change of the valve body to the second position 18 occurs. After that, the spring 25 returns the push button 10 and the pressure transfer component 31 to their home position The snap mechanism 21 of the snap component 32 with the snap is held in the second position 18 by the snap tips 35 and the snap fixtures 26. When the snap component 32 is locked into place in the second position 18, a rotational movement of the snap component 32 also occurs. The pressure transfer component 31 is then moved again by another actuation of the push button 10, until it also exerts a force on the snap component 32, which releases the snap tips 35 from the snap fixtures 26. Then the snap component 32 executes a further rotational movement (in the same direction of rotation), which returns it into a rotation angle 20 in which fixture grooves 34 of the snap component 32 can again engage with the guide rails 33 of the guide component 30. Then the snap component 32 in conjunction with the valve body 15, are returned to the first position 17.

The guide component 30 will be explained in greater detail below based on FIGS. 4 and 5. The guide component 30 is preferably held in a stationary manner (i.e., independently from the set position (first position 17 or second position 18) in the valve chamber 16. The guide component 30 is used to implement a positioning and guidance of the individual components (push button 10, pressure transfer component 31, snap component 32 and valve body 15) to one another. In particular, the guide component 30 forms the guide rails 33, which make possible a guidance of the pressure transfer component 31 and of the snap component 32 into the first position 17 and a snap into place of the snap component 32 in the second position 18. The guide rails 33 end in the form of snap tips 35, which, together with corresponding snap fixtures 26 on the snap component 32, also shown below, form the snap mechanism 21.

FIG. 6 and FIG. 7 illustrate the pressure transfer component 31 and the snap component 32 and their interaction in the snap mechanism 21.

FIG. 6 shows the pressure transfer component 31. The pressure transfer component 31 has a first cylindrical section

39, which preferably abuts on an underside of the push button 10 and which is set up to transfer the pressure from the push button 10. In addition, the pressure component 31 has fixture grooves 34, with which the above-described guide rails 33 engage and which specify the guidance along the axis 19 without rotational movement.

FIG. 7 shows the snap component 32, which also has fixture grooves 34 with which the above-described guide rails 33 engage. The snap component 32 has a second cylindrical section 40, which is received in a guide bore 42 of the pressure transfer component 31. As a result, the snap component 32 is axially guided. However, the snap component 32 can be rotated in relation to the pressure transfer component 31—at least when the snap component 32 has been moved from the region of the guide rails 33 beyond the snap tips 35 of the guide rails 33 to the rotation space 22 by the pressure transfer component 31, so that the guide rails 33 and the fixture grooves 34 are no longer in engagement with each other. Then the snap component 32 can be turned at a rotation angle 20 about the axis 19. The direction of rotation is determined by guide bevels 38 on the snap component 32 and on the pressure transfer component 31. The snap component 32 rotates such that the snap tips 35 of the guide rails 33 snap into place in snap fixtures 26 on the snap component 32. Then the snap component 32 and, with it the valve body 15, are in the second position 18. By re-actuating the push button 10, the snap component 32 is moved along the axis 19 again to the point where the snap tips of the guide rails 33 are moved beyond the edges 41 on the snap component 32 and, as a consequence, the snap fixtures 26 are no longer in engagement with the snap tips 35. The guide bevels 38 now guide the snap component 32 in a rotational movement so that the fixture grooves 34 of the snap component 32 are again in engagement with the guide rails 33 of the guide component 30. The snap component 32 can then also move back to the first position 17 together with the valve body 15.

FIG. 8 shows a schematic comprehensive view of an interior of a further described spray head 1 on a water faucet 2. Here again, the spray head 1 is connected to a fixed installation 28 of the water faucet 2 via a flexible hose 27 connected to a water inlet 3. A flow rate control valve 36 is also shown here schematically, which can be operated by the flow setting means 14 in order to set a flow rate for the fluid. The setting means 9 designed as a changeover valve 6 for selecting a spray pattern 13 is also shown here, which changeover valve can be operated using a push button 10. There are three different water outlets, specifically a first water outlet 4, which is supplied with water via a first water-conducting connection 7, a second water outlet 5, which is supplied with water via a second water-conducting connection 8 and a further water outlet 11, which is supplied with water via a further water-conducting connection 12. It is possible to use the setting means 9 to cycle between the water-conducting connections 7, 8, 12 with by actuating the push button 10, wherein in each case a different spray pattern 13 of the exiting or provided waters results. Only one of the water-conducting connections 7, 8, 12 is always open, whereas the other two water-conducting connections (8, 12) (7, 12) or (7, 8) are then closed.

LIST OF REFERENCES

1 spray head
2 water faucet
3 water inlet
4 first water outlet
5 second water outlet
6 changeover valve
7 first water-conducting connection
8 second water-conducting connection
9 setting means
10 push button
11 further water outlet
12 further water-conducting connection
13 spray pattern
14 flow rate setting means
15 valve body
16 valve chamber
17 first position
18 second position
19 axis
20 rotation angle
21 snap mechanism
22 rotation space
23 valve chamber wall
24 valve body surface
25 spring
26 snap fixture
27 hose
28 fixed installation
29 O-ring
30 guide component
31 pressure transfer component
32 snap component
33 guide rail
34 fixture groove
35 snap tip
36 flow rate control valve
37 outlet end
38 guide bevels
39 first cylindrical section
40 edge
41 edge
42 guide bore

The invention claimed is:

1. A spray head (1) for a water faucet (2) comprising:
a water inlet (3),
at least one first water outlet (4),
one second water outlet (5),
a flow rate setting means (14), and
one changeover valve (6), which is configured to selectively activate either;
a first water-conducting connection (7) from the water inlet (3) to the at least one first water outlet (4), or
a second water-conducting connection (8) from the water inlet (3) to the second water outlet (5),
wherein the changeover valve (6) is connected to a setting means (9), which comprises a push button (10) and which is designed such that an actuation of the push button (10) makes it possible to change from the first water-conducting connection (7) to the second water-conducting connection (8) and vice versa, and
wherein the flow rate setting means (14) is configured to adjust a flow rate of water through a water-conducting connection (7, 8) from the water inlet (3) to a water outlet (4, 5) of the spray head (1).

2. The spray head (1) according to claim 1, comprising at least one further water outlet (11), wherein the changeover valve (6) is additionally configured to activate a further water-conducting connection (12) from the water inlet (3) to the further water outlet (11), wherein by actuating the push button (10) it is possible to change to the further water-conducting connection (12), wherein by repeated actuation of the push button (10) it is possible to cycle through all water-conducting connections (7, 8, 12).

3. The spray head (1) according to claim 1, wherein each water outlet (4, 5) has assigned a spray pattern (13) so that the spray pattern (13) can be selected by actuating the push button (10).

4. The spray head (1) according to claim 1, wherein the flow rate setting means (14) is configured to infinitely adjust a flow rate.

5. The spray head (1) according to claim 1, wherein the changeover valve (6) has a valve body (15) and a valve chamber (16), in which the valve body (15) is moveably arranged and the first water-conducting connection (7) and the second water-conducting connection (8) extend through the valve chamber (16), wherein the first water-conducting connection (7) is opened and the second water-conducting connection (8) is closed when the valve body (15) is in a first position (17) in the valve chamber (16) and the second water-conducting connection (8) is opened and the first water-conducting connection (7) is closed when the valve body (15) is in a second position (18) in the valve chamber (16), wherein the first position (17) and the second position (18) are spaced apart from each other along an axis (19) of the valve chamber (16) and/or at a rotation angle (20) of the valve body (15) in the valve chamber (16) and by actuating the push button (10) the valve body (15) is moved from the first position (17) to the second position (18) and vice versa.

6. The spray head (1) according to claim 5, wherein a snap mechanism (21) is formed in the valve chamber (16) for the valve body (15), which snap mechanism can be used to hold the valve body (15) either in the first position (17) or in the second position (18).

7. The spray head (1) according to claim 6, wherein the snap mechanism (21) has a spring (25), which selectively presses the valve body (15) into a snap fixture (26) in the first position (17) or in the second position (18), wherein by actuating the push button (10) an overcoming of the spring force of the spring (25) causes a movement of the valve body (15) to the other position (17, 18), wherein, when the push button (10) is released, the spring (25) presses the valve body (15) is by to the other position (17, 18).

8. The spray head (1) according to claim 5, wherein the valve body (15) has at least one circumferential O-ring seal (29), which seals against a valve chamber wall (23) of the valve chamber (16).

9. The spray head (1) according to claim 5, wherein at least one first water-conducting connection (7) or one second water-conducting connection (8) opens circumferentially into the valve chamber (16).

10. The spray head (1) according to claim 5, wherein at least one first water-conducting connection (7) or a second water-conducting connection (8) opens on the end face into the valve chamber (16).

11. A spray head (1) for a water faucet (2) comprising:

a water inlet (3), at least one first water outlet (4), one second water outlet (5), at least one further water outlet (11), and one changeover valve (6), which is configured to selectively activate either:

a first water-conducting connection (7) from the water inlet (3) to the at least one first water outlet (4), or a second water-conducting connection (8) from the water inlet (3) to the second water outlet (5), or a further water-conducting connection (12) from the water inlet (3) to the further water outlet (11), wherein the changeover valve (6) is connected to a setting means (9), which comprises a push button (10) and which is designed such that an actuation of the push button (10) makes it possible to cycle through the first water-conducting connection (7), the second water-conducting connection (8), and the further water-conducting connection (12).

12. The spray head (1) according to claim 11, wherein each water outlet (4, 5, 11) has assigned a spray pattern (13) so that the spray pattern (13) can be selected by actuating the push button (10).

13. The spray head (1) according to claim 11, further comprising a flow rate setting means (14) configured to adjust a flow rate of water through a water-conducting connection (7, 8, 12) from the water inlet (3) to a water outlet (4, 5, 11) of the spray head (1).

14. The spray head (1) according to claim 13, wherein the flow rate setting means (14) is configured to infinitely adjust a flow rate.

15. The spray head (1) according to claim 11, wherein the changeover valve (6) is configured such that only one of the water-conducting connections (7, 8, 12) can be open at a time and the other two water-conducting connections (8, 12), (7, 12), or (7, 8) are then closed.

* * * * *